United States Patent [19]

Wensley

[11] 4,375,683
[45] Mar. 1, 1983

[54] FAULT TOLERANT COMPUTATIONAL SYSTEM AND VOTER CIRCUIT

[75] Inventor: John H. Wensley, Salem, Oreg.

[73] Assignee: August Systems, Tigard, Oreg.

[21] Appl. No.: 205,935

[22] Filed: Nov. 12, 1980

[51] Int. Cl.³ .................... G06F 11/00; H03K 19/08
[52] U.S. Cl. ...................................... 371/36; 307/464
[58] Field of Search ............... 371/36, 61; 364/200, 364/900; 307/464

[56] References Cited

U.S. PATENT DOCUMENTS

| | | | |
|---|---|---|---|
| 3,848,116 | 11/1974 | Moder et al. | 371/36 |
| 3,921,149 | 11/1975 | Kreis et al. | 364/200 |
| 4,091,293 | 5/1978 | Ando | 307/464 |
| 4,270,715 | 6/1981 | Norton et al. | 371/36 |

FOREIGN PATENT DOCUMENTS 1373014 11/1974 United Kingdom .................. 371/36

OTHER PUBLICATIONS

Smith, Recovery from Transient Faults in Redundant Systems, IBM Technical Disclosure Bulletin, vol. 23, No. 4, Sep. 1980, pp. 1707-1709.

Wakerly, Microcomputer Reliability Improvement Using Triple-Modular Redundancy, Proc. of the IEEE, vol. 64, No. 6, Jun. 1976, pp. 889-895.

Primary Examiner—Charles E. Atkinson
Attorney, Agent, or Firm—Thomas E. Schatzel

[57] ABSTRACT

A fault-tolerant computational system having a voter circuit which receives inputs from several computational devices and produces an output in agreement with a majority of the inputs. Also included is a clock circuit for synchronizing the output of data from the computational devices so that the input to the voter circuit is synchronized. The system may be adapted for fault detection by comparing the output of the voter circuit to the outputs of each of the computational channels.

8 Claims, 7 Drawing Figures

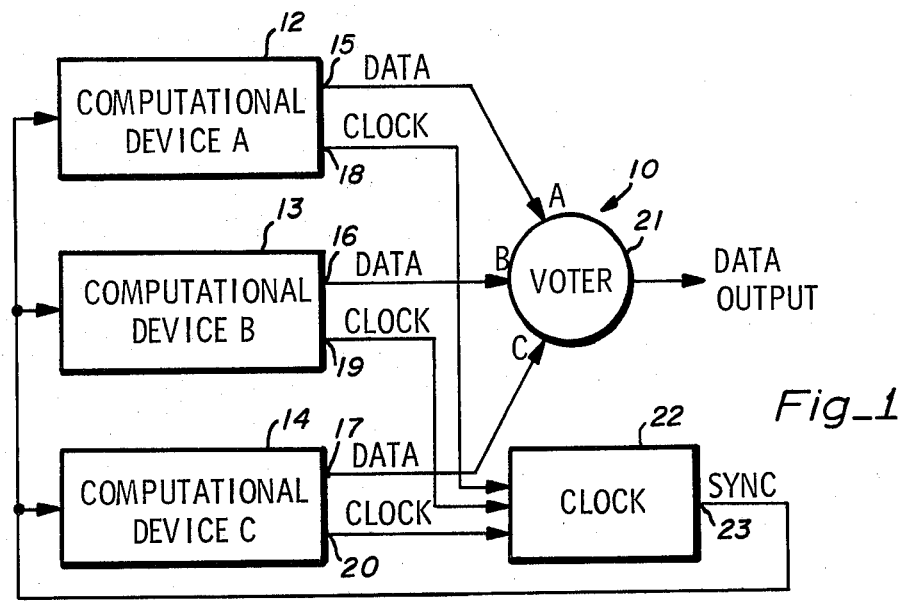
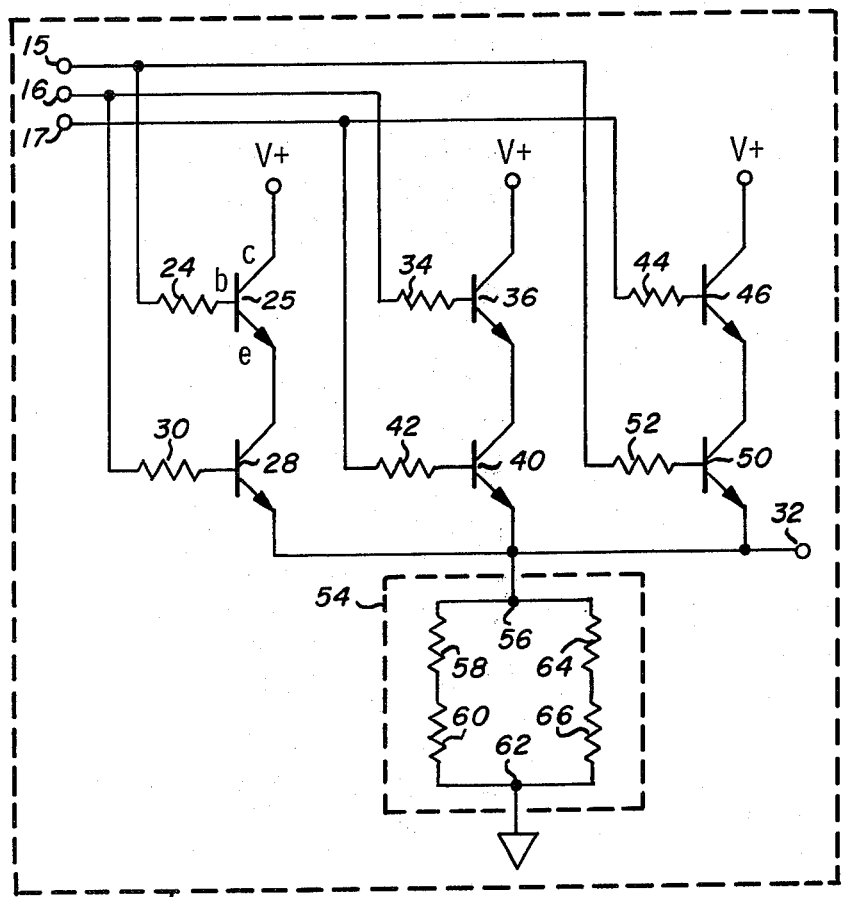

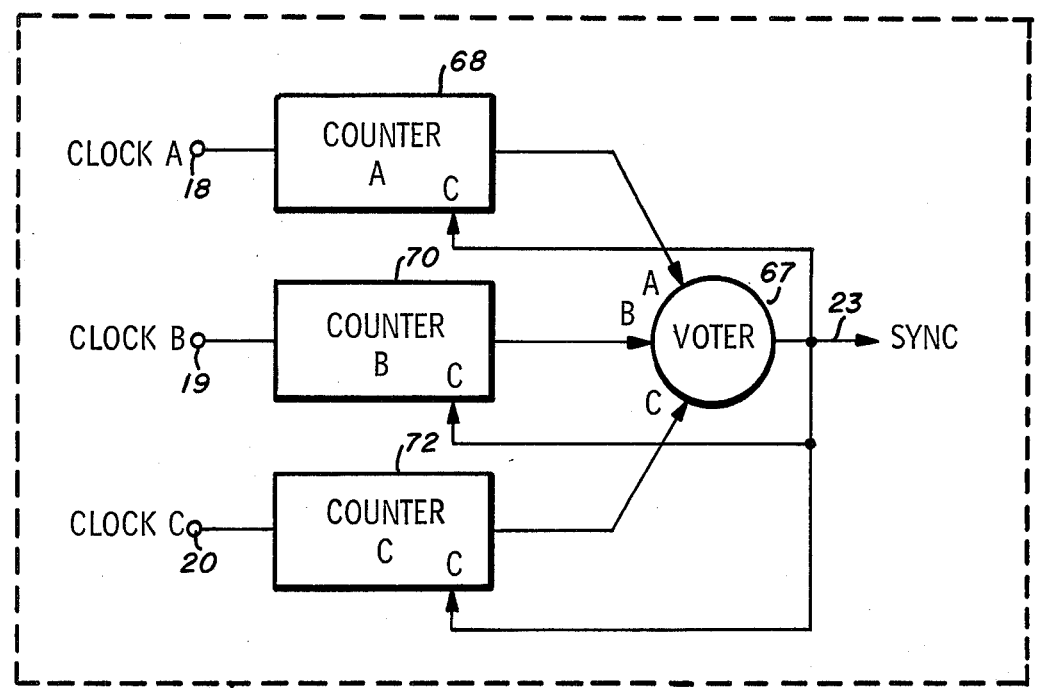
Fig_4
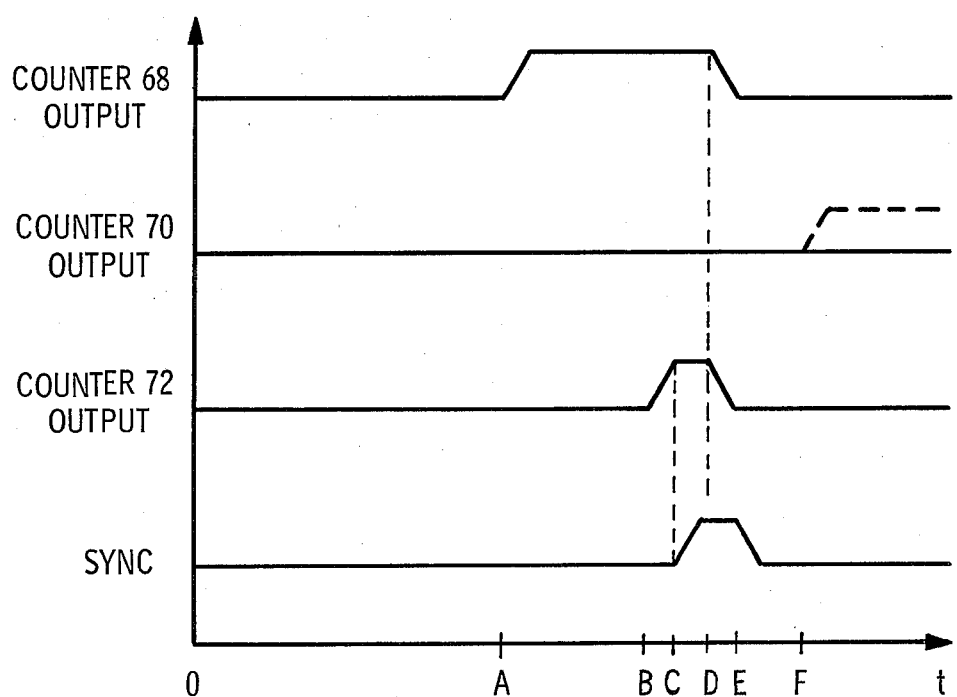
Fig_5

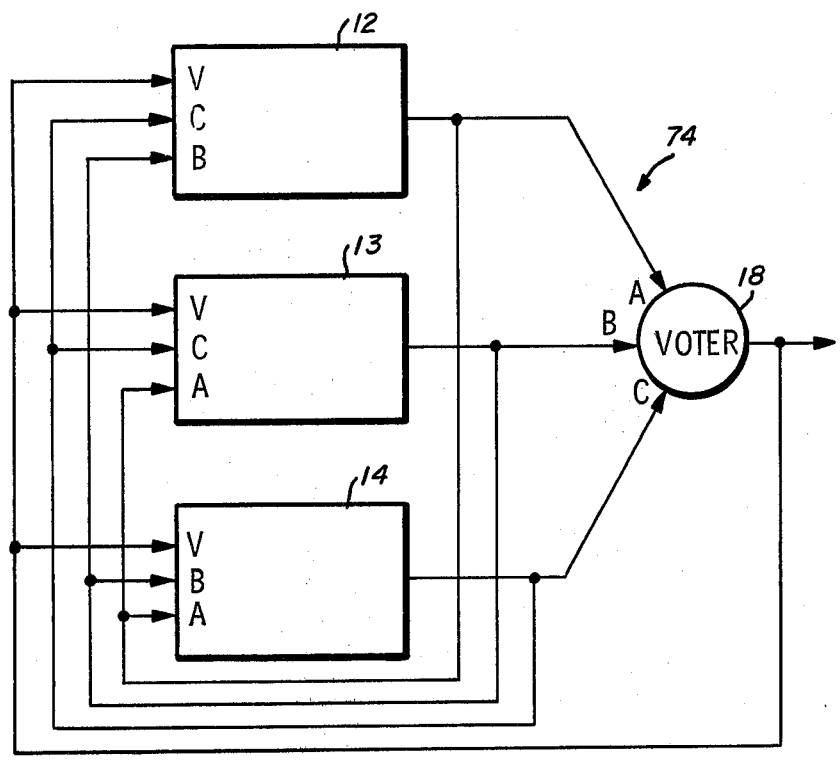
Fig_6
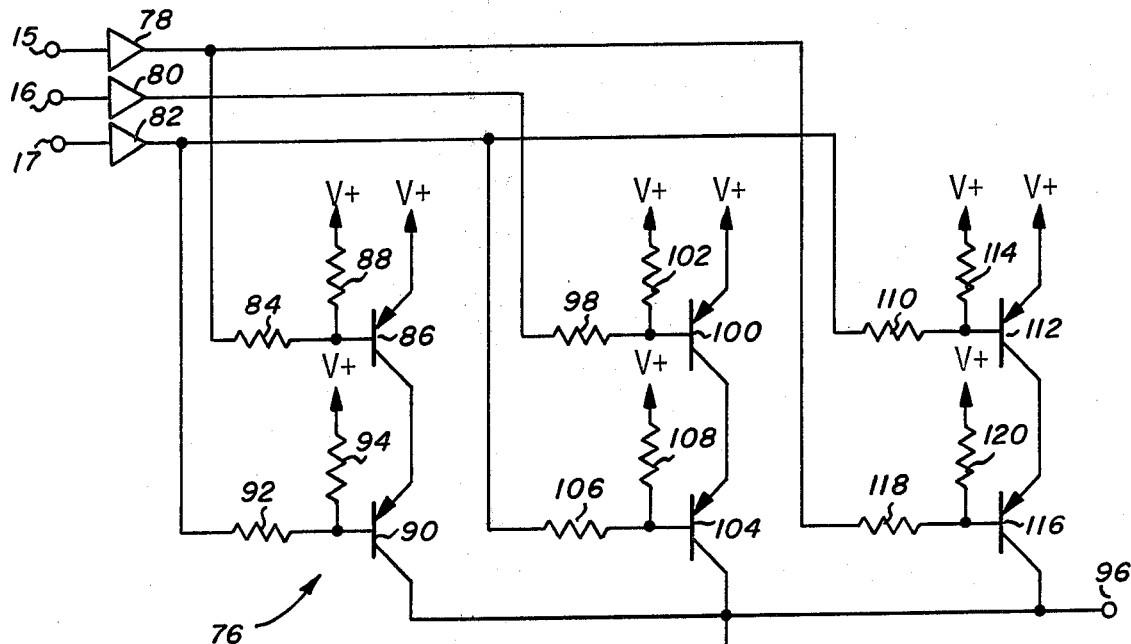
Fig_7

FAULT TOLERANT COMPUTATIONAL SYSTEM AND VOTER CIRCUIT

BACKGROUND OF THE INVENTION

1. Field of the Invention

The invention relates generally to circuits to be used in fault tolerant computing and more particularly to a voting circuit whereby multiple computational channels are polled to provide a highly reliable output.

2. Description of the Prior Art

A computer will behave in a specified manner as long as the parameters of physical components and the speed of operation remain within specified limits. However, it has been a common experience that unexpected abnormal physical changes in component parameters do occur in all kinds of computers. They are usually called malfunctions when the changes are temporary, and failures when the changes are permanent. Their effect is to cause an unspecified and disruptive change in one or more logic variables of the computer. Such a change is called a physical fault, or simply a fault when the physical nature of the fault is clear. Non-physical faults are referred to as "man-made" faults.

The possibility of randomly occuring faults makes the user uncomfortably aware of the physical side of his computer. A fault in a computer on-board a planetary spacecraft can mean loss of a mission. In commercial jets computers are used for functions such as navigation, stability augmentation, flight control and system monitoring. While performance of these functions by a computer is not critical, a fault may require significant disruption such as a change in destination. The usual solution to the problem of a failure is to manually remove and repair the cause of the fault.

The purpose of fault-tolerance is to offer an alternate solution to the fault problem in which the detection of faults and the recovery to normal operation are carried out as internal functions of the system itself. A number of articles dealing with various aspects of fault-tolerant digital systems appear in *Proceedings of the IEEE*, Volume 66, Number 10, October 1978.

In the prior art the principles of fault-tolerance have been limited in application to the internal functions of the system itself. However, peripheral devices themselves may experience faults which can render the entire system inoperable regardless of the computers fault-tolerant features. Most computer systems use external memory storage such as floppy disks for storing the operating system program, the compiler and other system programs. Without reliable transfer to and from external devices the overall system will be incapable of fault-tolerant operation.

SUMMARY OF THE PRESENT INVENTION

It is therefore an object of the present invention to provide circuitry that will assure fault-tolerance in the transfer of data to and from external devices.

It is a further object to provide fault-tolerant circuitry that will mask failures of one or more computational channels.

It is a further object to provide fault-tolerant circuitry that will function correctly in the event of the failure to any component in the circuit.

It is a further object to provide a clock system which will provide highly reliable synchronization between multiple computational channels.

It is a further object to provide a system for detecting the failure of a computational channel.

Briefly, the present invention includes a voter circuit which receives inputs from computational devices and generates an output in agreement with at least two of the inputs. The present invention also includes a fault-tolerant clock circuit which synchronizes the computational devices feeding data to the voter circuit. The voter circuit of the present invention may also be adapted to form a failure detecting circuit whereby the occurrence of a fault in one of the computational channels may be detected.

An advantage of the fault tolerant circuit of the present invention is that output data to peripheral devices will be more reliable.

Another advantage of the fault tolerant circuitry is that failures of a computational channel will be masked.

A further advantage of the fault tolerant circuitry is that the circuitry will function correctly despite the failure of a component of the circuitry.

A further advantage is that a clock system is provided for synchronization between different peripheral devices.

A further advantage is that failures of a computational channel will be detected.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a block diagram illustrating a fault-tolerant computational system in accordance with the present invention;

FIG. 2 is a circuit diagram illustrating the voter circuit of FIG. 1;

FIG. 3 is a chart illustrating the input and output conditions of the voter circuit of FIG. 2;

FIG. 4 is a block diagram illustrating the clock circuit network of FIG. 1;

FIG. 5 is a time chart illustrating various input and output signals of the clock circuit network of FIG. 4; and FIG. 6 is a block diagram illustrating an adaptation of the voter circuit of FIG. 2 in a fault detection circuit; and FIG. 7 is an alternate embodiment of a voter circuit in accordance with the present invention.

DETAILED DESCRIPTION OF THE PREFERRED EMBODIMENT

FIG. 1 illustrates a fault-tolerant computational system in accordance with the present invention and referred to by the general reference numeral 10. The computational system 10 includes a "computational device A" 12, a "computational device B" 13, and a "computational device C" 14. The devices 12, 13 and 14 each have a "DATA" output 15, 16 and 17, respectively, and a "CLOCK" output 18, 19 and 20, respectively. In operation, the computational devices 12, 13 and 14 may be in the form of a microprocessor. The DATA output of the computational device A 12 is connected to a voter circuit 21. The DATA output of the computational device B 13 is connected to the voter circuit 21 and the DATA output of the computational device C 14 is also connected to the voter circuit 21. The voter circuit 21 has an output labeled DATA OUTPUT. The "CLOCK" output of each of the computational devices 12, 13 and 14 is connected to a clock circuit 22. The clock circuit 22 has an output 23 labeled SYNC which is fed back to the input of each of the computational devices 12, 13 and 14.

FIG. 2 is a circuit diagram of the voter circuit 21 of the present invention. The voter circuit 21 has inputs from the computational devices 12, 13, and 14. The input from the computational device A at terminal 15 is connected through a resistive element 24 to an electronic control valve 25 illustrated in the form of an NPN transistor. The resistive element 24 is connected to the base of the transistor 25, the collector is connected to a positive voltage source V+ and the emitter is connected to an electronic control valve 28 illustrated in the form of an NPN transistor. The emitter of the transistor 25 is connected to the collector of the transistor 28. The transistor 28 is connected to terminal 16 to receive an input from the computational device B through a resistive element 30. The emitter of the transistor 28 is tied to an output terminal 32.

The input to the voter circuit 21 from the computational device B is also received through a resistive element 34 to an electronic control valve 36 illustrated in the form of an NPN transistor. The resistive element 34 is connected to the base of the transistor 36. The collector of the transistor 36 is connected to a positive voltage source V+. The emitter of the transistor 36 is connected to an electronic control valve 40 illustrated in the form of an NPN transistor. The collector of the transistor 40 is connected to the emitter of the transistor 36. The input to the voter circuit 21 from the computational device C is connected through a resistive element 42 to the base of the transistor 40. The emitter of the transistor 40 is tied to the output terminal 32.

The input to the voter circuit 21 from the computational device C is connected through a resistive element 44 to an electronic control valve 46 illustrated in the form of an NPN transistor. The resistive element 44 is tied to the base of the transistor 46. The collector of the transistor 46 is connected to a positive voltage source V+. The emitter of the transistor 46 is connected to an electronic control valve 50 illustrated in the form of an NPN transistor. The collector of the transistor 50 is connected to the emitter of the transistor 46. The input from the computational device A is connected through a resistive element 52 to the base of the transistor 50. The emitter of the transistor 50 is connected to the output terminal 32. Each of the transistor pairs 25 and 28, 36 and 40, and 46 and 50 is referred to as a limb of the voter circuit 21.

The voter circuit 21 further includes a resistive network 54. The resistive network 54 includes an input terminal 56 connected to the output terminal 32 of the voter circuit 21. The input terminal 56 is connected through a resistive element 58 in series with a resistive element 60 to an output terminal 62 of the resistive network 54. The input terminal 56 is also connected through a resistive element 64 in series with a resistive element 66 to the output terminal 62. Each of the resistive elements 24, 30, 34, 42, 44 and 52 should have a resistive value approximately twenty times the overall resistive value of the resistive network 54.

The operation of the voter circuit 21 is believed to be as follows. "DATA" inputs to the voter circuit 21 will be a fixed voltage, e.g. five volts indicating a logical "1" or zero volts indicating a logical "0". When all the DATA inputs at terminals 15, 16 and 17 are five volts, all of the transistors 25, 28, 36, 40, 46 and 50 in the voter circuit 21 will be on. When the transistor 25 is on, current will flow through the transistor 25 to the transistor 28. The transistor 28 will have a "DATA" input from terminal 16 of device B of five volts which will cause the transistor 28 to be on and thus the current will flow through the transistor 28. The output current from the transistor 28 will then flow through the resistive network 54 to the ground reference. Likewise, when the inputs to the transistors 36 and 40 are five volts, current will flow from the positive voltage source V+ through the transistors 36 and 40 and through the resistive network 54 to the ground reference. Current will also flow through the transistors 46 and 50 and then through the resistive network 54 to the ground reference. When current is flowing through the resistive network 54 the output voltage at the output terminal 32 will be close to five volts, indicating a logical "1".

When the inputs from the computational channels are zero volts all the transistors 25, 28, 36, 40, 46 and 50 of the voter circuit 21 will be off. When the transistor 25 is off, no current will flow through it and thus no current will flow through the transistor 28 or the resistive network 54. Likewise, no current will flow through the transistor 36 to the transistor 40 and then to the resistive network 54. Also, there will be no current flow through the transistors 46 and 50. Since no current flows through the resistive network 54, the voltage at the output terminal 32 will be close to zero volts.

A fault in the "computational device A" might cause its output to be zero volts when the correct output should be five volts. However, the computational devices B and C would have outputs of five volts. Where the DATA input to the voter circuit 21 is zero volts from device A and five volts for devices B and C, the transistors 25 and 50 which receive inputs from terminal 15 will be off. The transistor 28 which receives an input from channel B will be on. However, since transistor 25 is off, no current will flow through transistor 28. Transistor 36 which receives an input from terminal 16 of device B and transistor 40 which receives an input from terminal 17 of device C will both be on; thus current will flow through the transistors 36 and 40 and then flow through the resistive network 54. The transistor 50 which receives an input from terminal 15 of device A will be off; thus no current will flow through the transistors 46 and 50. The output voltage appearing at the output terminal 32 will be close to five volts since current flows through the transistors 36 and 40. Thus, a fault in device A does not change the output of the voter circuit 21.

A fault in the "computational device A" may cause its output to be five volts instead of zero volts. An incorrect input of five volts to the voter circuit 21 from device A will cause the transistor 25 to be on. However, the input from terminal 16 of device B received by the transistor 28 will be close to zero volts. Thus, the transistor 28 will be off and no current will flow through the transistor 28 and then through the resistive network 54. The transistors 36 and 40 which receive inputs from devices B and C, respectively, will both be off. Therefore, no current will flow through the transistors 36 and 40 and then through the resistive network 54. The transistor 50 which receives an input from device A will be on. However, the transistor 46 which receives an input from device C will be off. Therefore, no current will flow through the transistors 46 and 50 and then through the resistive network 54. Since no current flows through the resistive network 54 the output voltage at the output terminal 32 will be close to zero volts. Again, the incorrect input at terminal 15 of device A does not cause an incorrect output from the voter circuit 21.

FIG. 3 is a chart illustrating the fault situations of the voter circuit 21. Each row of the chart contains the channel inputs from the device A, B and C and the output which results therefrom.

A failure could also occur in the components of the voter circuit 21 resulting from a transistor turning on when it should be off, a transistor turning off when it should be on or one of the resistors 58, 60, 64 or 66 becoming of a higher or lower resistance. If the transistor 25 turns on when it should be off current will not flow through the transistor 28 when the input from channel B is zero volts but will flow through the transistor 28 when the input from device B is five volts. Thus, the transistor 25 being on when it should be off will not effect the operation of the voter circuit 21. If the transistor 25 is off when it should be on, current will not flow through the transistor 28 whether the input from device B is five volts or zero volts. However, the voter circuit 21 will continue to produce the correct output since the transistors 36 and 40 or the transistors 46 and 50 will continue to operate properly. If one of the resistive elements in the resistive network 54 becomes of a higher or lower resistance, the only affect will be to change the overall resistance of the combination which will have no effect on the voter circuit as a whole.

FIG. 4 illustrates the clock circuit network 22 of the present invention. The clock circuit network 22 includes a voter circuit 67 which receives inputs from a counter 68, a counter 70 and a counter 72. The voter circuit 67 may be identical to the voter circuit 21 previously described. The counter 68 receives the CLOCK output 18 from the computational device 12, the counter 70 receives the CLOCK output 19 from the computational device 13 and the counter 72 receives the CLOCK output 20 from the computational device 14. The counters 68, 70 and 72 will generate an output after receiving a specified number of clock pulses from the computational device. Each of the counters 68, 70 and 72 are set to generate an output after receiving the same number of clock pulses. The output of the voter circuit 67 is connected to a clear input "C" of each of the counters 68, 70 and 72. The output of the voter circuit 67 also provides a SYNC output from the clock circuit network 22 which is fed to each of the computational devices 12, 13 and 14 as illustrated in FIG. 1.

FIG. 5 is a time chart illustrating the outputs of the counters 68, 70 and 72 and the SYNC output of the clock circuit network 22. After the specified number of clock pulses are received by the counter 68 an output will be generated at time A. Counter 72 will generate an output after receiving the same number of clock pulses as illustrated at time B. At time C, the inputs to the voter circuit 67 from the counter 68 and counter 72 will both be high; thus, as hereinbefore described, the voter circuit 67 will generate an output. At time D, the output of the voter circuit 67 will be received by each of the counters and will cause the counters to be reset. The output of the counters will then go low and thus the output of the voter circuit 67 will also go low as illustrated at time E. At time F, as shown by a phantom line, the counter 76 would have generated an output after having received the specified number of clock pulses. However, since the counter 76 also received the clear input, no output is generated. Thus, the clock circuit network 22 may be used to synchronize the DATA output from each of the computational devices.

FIG. 6 is an illustration of an adaptation of the voter circuit 21 in a fault detection circuit referred to by the general reference numeral 74. The fault detection circuit 74 includes the computational devices 12, 13 and 14. Each of the computational devices is connected to the voter circuit 21. The output of the voter circuit 21 is fed to each of the computational devices 12, 13 and 14. Each of the computational devices 12, 13 and 14 also receives the outputs from the other two computational devices. The computational device 12 will compare by computer program the inputs received from each of the computational devices 13 and 14 to the input received from the voter circuit 21. A difference in the inputs indicates the occurrence of a fault in the computational device 13 or 14. Likewise, the computational devices 13 and 14 will compare the inputs from each of the other computational devices to the input from the voter circuit 21.

FIG. 7 illustrates an alternative embodiment of a voter circuit in accordance with the present invention and referred to by the general reference numeral 76. The voter circuit 76 receives the data output 15 from the computational device 12, the data output 16 from the computational device 13 and the data output 17 from the computational device 14. The data output 15 is fed to an inverter 78, the data output 16 is fed to an inverter 80, and the data output 17 is fed to an inverter 82. The inverters 78, 80, and 82 will invert the logical value of the input so that where the input is five volts, the output will be zero volts and vice versa. The output of the inverter 78 is fed to a resistor 84 which is connected to the base of a PNP transistor 86. Also connected to the base of the transistor 86 is a resistor 88 which is also connected to a positive voltage source V+. The emitter of the transistor 86 is connected to the positive voltage source V+. The collector of the transistor 86 is connected to the emitter of a PNP transistor 90. The output of the inverter 82 is fed to a resistor 92 which is connected to the base of the transistor 90. A resistor 94 is connected to the voltage source V+ and to the base of the transistor 90. The collector of the transistor 90 is connected to an output terminal 96.

The output of the inverter 80 is connected to a resistor 98 which is also connected to the base of a PNP transistor 100. The resistor 102 is connected to the voltage potential V+ and to the base of the transistor 100. The emitter of the transistor 100 is connected to the voltage potential V+. The collector of the transistor 100 is connected to the emitter of a PNP transistor 104. The output of the inverter 82 is fed to a resistor 106 which is connected to the base of the transistor 104. A resistor 108 is connected to the voltage potential V+ and to the base of the transistor 104. The collector of the transistor 104 is connected to the output terminal 96.

The output of the inverter 82 is fed to a resistor 110 which is connected to the base of a PNP transistor 112. A resistor 114 is connected to the voltage potential V+ and to the base of the transistor 112. The emitter of the transistor 112 is connected to the voltage potential V+. The collector of the transistor 112 is connected to the emitter of a PNP transistor 116. The output of the inverter 78 is fed to a resistor 118 which is connected to the base of the transistor 116. A resistor 120 is connected to the voltage potential V+ into the base of the transistor 116. The collector of the transistor 116 is connected to the output terminal 96.

A resistive network 122 is connected to the output terminal 96. The resistive network 122 includes a resistor 124 and a resistor 126 connected in series between the output terminal 96 and a voltage potential V— and also includes a resistor 128 and a resistor 130 connected in series between the output terminal 96 and the voltage potential V—.

The operation of the voter circuit 76 is believed to be as follows. Assume the data input on lines 15 and 17 is five volts. The output of inverters 78 and 82 will therefore be zero volts. Thus, no signal is fed from the inverter 78 to the base of the transistor 86 or from the inverter 82 to the base of the transistor 90. The voltage potential at the base of the transistor 86 will be below V+ due to the voltage drop across the resistor 88. Under this condition, the PNP transistor 86 will be on and current will flow from the emitter. Also, the voltage potential at the base of the PNP transistor 90 will be below V+, while the voltage potential at the collector is at V+. Thus, current will also flow through the transistor 90 and the voltage potential at the output terminal 96 will be V+. Therefore, an output at the terminal 96 of V+ indicates inputs on lines 15 and 17 of five volts.

On the other hand, if the inputs on lines 15 and 17 to the inverters 78 and 82, respectively, are zero volts, the output of the inverters 78 and 82 will be five volts. Thus, the voltage potential at the base of the transistors 86 and 90 will be above the reference potential V+ and thus the transistors 86 and 90 will be off and no current will flow through them. In this situation, the voltage at the output terminal 96 will be V—. Thus, an output at the terminal 96 of V— indicates inputs on the lines 15 and 17 of zero volts.

The operation of the transistor pair 100 and 104 and the transistor pair 112 and 116 will be the same as the operation of the transistor pair 86 and 90. The voter circuit 76 will have the same fault tolerant features as the voter circuit 21 of the previously described embodiment. The voter circuit 76 is an improvement of the voter circuit 21 in that the outputs at the terminal 96 will be a solid V+ or V— rather than close to the reference potentials as is exhibited in the operation of the voter circuit 21.

The fault-tolerant computational system 10 of the present invention provides a highly reliable data output by comparing the outputs of three computational devices in the voter circuit 21 which will generate an output that agrees with two or more of the inputs. Thus, a failure of one of the computational devices will be masked. In addition, a failure of one of the components in the voter circuit 21 will not of itself cause an incorrect output from the voter circuit 21. The clock circuit network 22 assures that the computational devices will operate synchronously and output data to the voter circuit 21 at the same time. Finally, the voter circuit 21 may be adapted to the fault detection circuit 74 which will indicate the occurrence of a fault in any one of the computational devices.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:
1. A fault-tolerant computation system comprising:
a plurality of computational devices producing binary data output signals; and
a voter circuit having an input connected to each of the computational devices to receive the data output signals of the devices and adapted for producing an output which agrees with a majority of the binary input data signals received from the computation devices; wherein:
each computational device receives the output from the voter circuit and each of the other computational devices, whereby a disagreement between the voter circuit and one of the computational devices may be detected.
2. A fault-tolerant computational system comprising:
a plurality of computational devices producing binary data output signals and clock pulses;
a voter circuit having an input connected to each of the computational devices to receive the data output signals of the devices and adapted for producing an output which agrees with a majority of the binary input data signals received from the computational devices; and
a fault detection device for receiving the outputs from the voter circuit and each of the computational devices whereby a disagreement between the voter circuit and one of the computational devices may be detected.
3. The fault-tolerant computational system of claims 1 or 2 adapted for three computational devices, wherein:
the voter circuit includes three pairs of electronic control valves with each of said control valves within each pair connected in series, and the three pairs connected in parallel, and each of said electronic control valves connected to receive an input from one of the computational devices such that each of said pairs of electronic control valves receives a different combination of inputs from the computational devices, and including a resistive network connected to the three pairs of electronic control valves.
4. The fault-tolerant computational system of claims 3, 1 or 2, wherein:
the computational devices produce clock pulses; and further comprising:
a clock circuit connected to each of the computational devices for receiving said clock pulses, the output of the clock circuit being connected to each of the computational devices for synchronizing the output data of the computational devices fed to the voter circuit.
5. The fault-tolerant computational system of claim 4, wherein:
the clock circuit includes a plurality of pulse counters with each of said counters connected to receive said clock pulses from one of the computational devices, and a voter circuit included in the clock circuit which receives an output from each of said counters and provides an output fed back to each of the counters and fed to each of the computational devices whereby said output resets each of said counters and synchronizes the data output from the computational devices.
6. A fault-tolerant computational system comprising:
a plurality of computational devices producing binary data output signals and clock pulses;

a voter circuit having an input connected to each of the computational devices to receive the data output signals of the devices and adapted for producing an output which agrees with a majority of the binary input data signals received from the computational devices; and a clock circuit connected to each of the computational devices for receiving said clock pulses, the output of the clock circuit being connected to each of the computational devices for synchronizing the output of data of the computational devices fed to the voter circuit;

the voter circuit including sets of electronic control valves with each of said control valves within each set connected in series, and the sets connected in parallel, and each of said electronic control valves connected to receive the input from one of the computational devices such that each of said sets of electronic control valves receives a different combination of inputs from the computational devices, and including a resistive network connected to the sets of electronic control valves;

the clock circuit including a plurality of pulse counters with each of said counters connected to receive said clock pulse from one of the computational devices, and a voter circuit included in the clock circuit to receive an output from each of said counters and provide an output fed back to each of the counters and fed to each of the computational devices whereby said output can reset each of said counters and synchronize the data output from the computational devices; and each computational device connected to receive the output from the voter circuit and each of the other computational devices whereby a disagreement between the voter circuit and one of the computational devices may be detected.

7. A fault-tolerant computational system comprising:
a set of three computational devices to produce binary data output signals; and
a voter circuit having an input connected to each of the computational devices to receive the data output signals of the devices and adapted for producing an output which agrees with a majority of the binary input data signals received from the computational devices;
the voter circuit including three pairs of electronic control valves with the two electronic control valves in each pair connected in series, and the three said pairs connected in parallel, and each of said control valves connected to receive an input from one of the computational devices such that each of said pairs of electronic control valves can receive a different combination of two inputs from differing respective pairing of the three computational devices, and in a manner such that no two electronic control valves which constitute such a pair have their respective inputs connected to the same computational device, and including a resistive network connected to the three pairs of electronic control valves; whereby whenever at least two of the computational devices produce an identical output, one of the pairs of electronic valves will have the two valves in that pair connected to the respective outputs of the two computational devices producing identical outputs, and thereby cause the two electronic valves in said pair to attain the same state as to being either on or off, and thus result in an output voltage across the resistor network corresponding to the state of said electronic valves.

8. A fault-tolerant computational system comprising:
a plurality of computational devices for producing binary data output signals and clock pulses;
a voter circuit having an input connected to each of the computational devices to receive the data output signals of the devices and adapted for producing an output which agrees with the majority of the binary input data signals received from the computational devices; and
a clock circuit connected to each of the computational devices for receiving said clock pulses, the output of the clock circuit being connected to each of the computational devices for synchronizing the output of data of the computational devices fed to the voter circuit;
the clock circuit including a plurality of pulse counters with each of said counters connected to receive said clock pulses from one of the computational devices, and a second voter circuit, included in the clock circuit, to receive an output from each of said counters and provide an output fed back to each of the counters and fed to each of the computational devices whereby said output of the voter circuit can reset each of said counters and synchronize the data output from the computational devices.

* * * * *